United States Patent
Liu et al.

(10) Patent No.: US 9,667,508 B2
(45) Date of Patent: May 30, 2017

(54) METHOD AND SYSTEM FOR TESTING AND MONITORING A REAL-TIME STREAMING MEDIA RECOGNITION SERVICE PROVIDER

(71) Applicant: Tencent Technology (Shenzhen) Company Limited, Shenzhen (CN)

(72) Inventors: Jian Liu, Shenzhen (CN); Dadong Xie, Shenzhen (CN); Jie Hou, Shenzhen (CN); Hailong Liu, Shenzhen (CN); Bo Chen, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 0 days.

(21) Appl. No.: 15/191,351

(22) Filed: Jun. 23, 2016

(65) Prior Publication Data

US 2016/0308737 A1 Oct. 20, 2016

Related U.S. Application Data

(63) Continuation of application No. PCT/CN2015/081331, filed on Jun. 12, 2015.

(30) Foreign Application Priority Data

Jul. 10, 2014 (CN) .......................... 2014 1 0327529

(51) Int. Cl.
*G06F 15/16* (2006.01)
*H04L 12/24* (2006.01)
(Continued)

(52) U.S. Cl.
CPC ...... *H04L 41/5038* (2013.01); *H04L 65/4076* (2013.01); *H04L 65/607* (2013.01);
(Continued)

(58) Field of Classification Search
CPC ............... H04L 41/5038; H04L 65/607; H04L 65/4076; H04L 67/42; H04N 21/24; H04N 17/004

See application file for complete search history.

(56) References Cited

U.S. PATENT DOCUMENTS 8,850,263 B1 * 9/2014 Yourtee ............... G06F 11/0709
  714/20
2002/0044531 A1 * 4/2002 Cooper ............... H04L 12/2697
  370/248

(Continued)

FOREIGN PATENT DOCUMENTS

CN 101521833 A 9/2009
CN 101521834 A 9/2009

(Continued)

OTHER PUBLICATIONS

Tencent Technology, IPRP, PCT/CN2015/081331, Nov. 1, 2016, 6 pgs.

(Continued)

*Primary Examiner* — Mohamed Wasel
(74) *Attorney, Agent, or Firm* — Morgan, Lewis & Bockius LLP

(57) ABSTRACT

A computer system obtains a streaming media signal source, selects a testing sample from the streaming media signal source, records characteristics of the testing sample, and obtains an expected output according to the characteristics of the testing sample. Next, the computer system converts the testing sample into a digital streaming format preset by a service provider and initiates a media recognition request according to the testing sample in the digital streaming format to the service provider. After receiving a media recognition result of the testing sample returned by the service provider according to the media recognition request, the computer system compares the media recognition result with the expected output and indicates whether the service provider is normal in accordance with the comparison result.

17 Claims, 3 Drawing Sheets

(51) Int. Cl.
    H04N 17/00    (2006.01)
    H04L 29/06    (2006.01)
    H04N 21/24    (2011.01)
(52) U.S. Cl.
    CPC ........... H04L 67/42 (2013.01); H04N 17/004 (2013.01); *H04N 21/24* (2013.01)

(56)          References Cited

U.S. PATENT DOCUMENTS

2008/0114562 A1    5/2008  Sul et al.
2010/0062722 A1*   3/2010  Dykema ............. H04B 17/327
                                                      455/67.11
2010/0087152 A1*   4/2010  Mourad ............ H04B 17/0085
                                                      455/67.11

FOREIGN PATENT DOCUMENTS

CN          101674492 A      3/2010
CN          102164248 A      8/2011
CN          102780914 A     11/2012
CN          104093038 A     10/2014

OTHER PUBLICATIONS

Tencent Technology, ISRWO, PCT/CN2015/081331, Sep. 1, 2015, 7 pgs.

* cited by examiner

METHOD AND SYSTEM FOR TESTING AND MONITORING A REAL-TIME STREAMING MEDIA RECOGNITION SERVICE PROVIDER

RELATED APPLICATION

This application is a continuation application of PCT Patent Application No. PCT/CN2015/081331, entitled "METHOD AND SYSTEM FOR TESTING AND MONITORING A REAL-TIME STREAMING MEDIA RECOGNITION SERVICE PROVIDER" filed on Jun. 12, 2015, which claims priority to Chinese Patent Application No. 201410327529.4, entitled "METHOD AND SYSTEM FOR TESTING AND MONITORING A REAL-TIME STREAMING MEDIA RECOGNITION SERVICE PROVIDER" filed on Jul. 10, 2014, both of which are incorporated by reference in their entirety.

TECHNICAL FIELD

The present application relates to multimedia technologies, and in particular, to method and system for testing and monitoring a real-time streaming media recognition service provider.

BACKGROUND

Streaming media are audio, image, video, text and multimedia files transmitted in a network in a manner of streaming. The network refers to a wired broadcasting network, a wireless broadcasting network, the Internet and the like. A streaming media file format is a media format that supports streaming transmission and playing.

Real-time streaming media usually use streaming transmission. The streaming transmission is to compress multimedia files such as video and into separate compressed packages that are continuously transmitted to a computer by a server in real time. In a system using streaming transmission, to view content of a file, a user does not need to wait until the file is completely downloaded as the user does during non-streaming playing. Instead, after a few seconds or dozens of seconds of startup delay, the user can play the streaming media file such as compressed video or audio on a computer with a corresponding player, and the rest part will be continuously downloaded until the playing is completed.

A conventional system for testing and monitoring streaming media use fixed testing samples and output results that can be used repeatedly. However, in a real-time streaming media recognition service provider, because the streaming media changes in real time, whether a testing sample is effective depends on time. A corresponding result can be recognized in an effective time window, while the testing sample becomes ineffective out of the time window. The real-time streaming media recognition service provider cannot return an expected recognizing result, and therefore, whether functions and stability of the real-time streaming media recognition service provider are normal cannot be determined.

SUMMARY

The above deficiencies and other problems associated with the conventional approach of testing and monitoring the function and performance of a real-time streaming media recognition service provider are reduced or eliminated by the invention disclosed below. In some embodiments, the present application is implemented in a computer system (e.g., computer server, etc.) that has one or more processors, memory and one or more modules, programs or sets of instructions stored in the memory for performing multiple functions. Instructions for performing these functions may be included in a computer program product configured for execution by one or more processors and stored in a non-transitory computer readable medium.

One aspect of the present application involves a computer-implemented method of testing and monitoring a real-time streaming media recognition service provider performed at a computer system. The computer system obtains a streaming media signal source, selects a testing sample from the streaming media signal source, records characteristics of the testing sample, and obtains an expected output according to the characteristics of the testing sample. Next, the computer system converts the testing sample into a digital streaming format preset by the service provider and initiates a media recognition request according to the testing sample in the digital streaming format to the service provider. After receiving a media recognition result of the testing sample returned by the service provider according to the media recognition request, the computer system compares the media recognition result with the expected output and indicates whether the service provider is normal in accordance with the comparison result.

Another aspect of the present application involves a computer system including memory, one or more processors, and one or more program modules stored in the memory and configured for execution by the one or more processors to perform the method described above.

Yet another aspect of the present application involves a non-transitory computer readable storage medium having stored therein one or more programs for execution by one or more processors of a computer system. The one or more programs include instructions, when executed by the one or more processors, cause the processors to perform the operations as described above.

BRIEF DESCRIPTION OF THE DRAWINGS

The aforementioned features and advantages of the invention as well as additional features and advantages thereof will be more clearly understood hereinafter as a result of a detailed description of preferred embodiments when taken in conjunction with the drawings.

Like reference numerals refer to corresponding parts throughout the several views of the drawings.

DESCRIPTION OF EMBODIMENTS

Reference will now be made in detail to embodiments, examples of which are illustrated in the accompanying drawings. In the following detailed description, numerous specific details are set forth in order to provide a thorough understanding of the subject matter presented herein. But it will be apparent to one skilled in the art that the subject matter may be practiced without these specific details. In other instances, well-known methods, procedures, components, and circuits have not been described in detail so as not to unnecessarily obscure aspects of the embodiments.

In order to make the objectives, technical solutions, and advantages of the present application easier to understand, the present application is described in further detail in the following with reference to the accompanying drawings and the embodiments. It should be understood that, the specific embodiments described here are only used to explain the present application, but are not used to limit the present application.

Today, more and more people use different client-side electronic devices (e.g., desktop, laptop, tablet and smartphones) to receive real-time information (e.g., news, a sports game) from online service providers through streaming media services offered by the online service providers. Because of the diverse nature of these client-side devices and the real-time fashion of the Internet environment, the online service providers need to monitor the quality of such streaming media services in real time, identify issues experienced by any client-side devices and fix the issues as quickly as possible. The present application is directed to a method of testing and monitoring the function and performance of a real-time streaming media recognition service provider and a system implementing the method. Using such method and system, the operator of the real-time streaming media recognition service provider can identify and solve an issue experienced by its customers before the issue escalates into a significant problem or even a disaster in terms of user experience.

Figure 1:
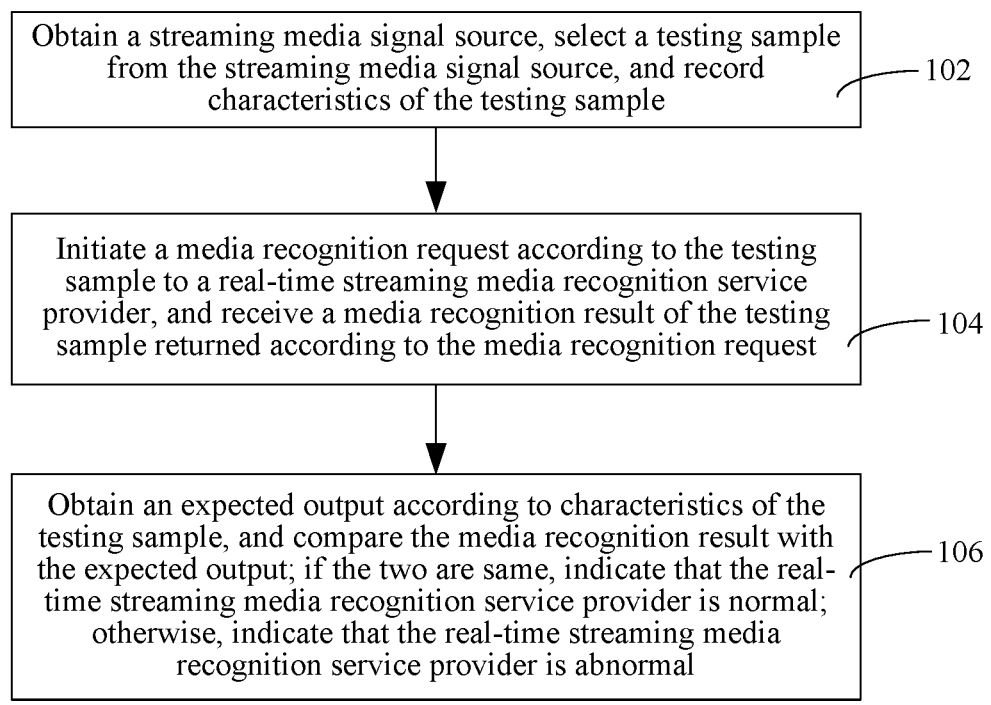
FIG. 1 is a flowchart of a method for testing and monitoring a real-time streaming media recognition service provider in an embodiment.

FIG. 1 is a flowchart of a method for testing and monitoring a real-time streaming media recognition service provider in an embodiment. As shown in FIG. 1, the method for testing a real-time streaming media recognition service provider includes the following steps:

Step 102: Obtain a streaming media signal source, select a testing sample from the streaming media signal source, and record characteristics of the testing sample.

Specifically, a real-time streaming media signal source is obtained, where the streaming media signal source may be a signal source captured from a television or radio or by other capturing devices.

After the obtaining a streaming media signal source, the method further includes: converting the testing sample into a digital streaming format preset by a real-time streaming media service. In some embodiments, each digital streaming format is supported by a predefined set of client-side devices. The system rotates among a set of digital streaming formats to perform the testing and monitoring operations to make sure that the real-time streaming media service provider support as many client-side devices of different types as possible. In some embodiments, the system randomly selects one digital streaming format to perform the testing and monitoring operations. In other embodiments, the system follows a predefined order to perform the testing and monitoring operations for different digital streaming formats.

The streaming media signal source may be a signal source such as television audio, an image screenshot or radio audio. The streaming media signal source is converted into a digital streaming format preset by the real-time streaming media service. The converted signal source may be audio of a certain length, one or more image screenshots, or an extracted feature value of audio or an image. Then, a streaming media segment is selected from the converted streaming media signal source, and is used as a testing sample for testing and monitoring, and identification information such as an attribute and an identifier of the testing sample is recorded.

The testing sample refers to streaming media data input to a real-time streaming media recognition service provider. The real-time streaming media recognition service provider is a background service system which processes streaming media in a backend server, recognizes certain information from streaming media information, and provides more specific recognizing information. For specific content types of different streaming media, the system can recognize different streaming media such as audio, video, multimedia, and text. Testing refers to a system environment for verifying actual functions and performance of the real-time streaming media recognition service provider before releasing its service. Monitoring refers to a system environment for monitoring and tracking stability of the real-time streaming media recognition service provider and issuing fault alarms after releasing its service.

The recorded characteristics of the testing sample include the attributes and identifier of the testing sample. Attributes of different testing samples are different. For example, if a testing sample is television audio, the attributes include time when the television audio is extracted, length and size of the television audio, television channel information of the extracted television audio, a source of the extracted television audio and the like. The identifier is used for uniquely identifying a testing sample, such as television channel information.

In the method for testing and monitoring for a real-time streaming media recognition service provider, the step of selecting a testing sample from the streaming media signal source includes: selecting the testing sample from the streaming media signal source at a preset time interval. Specifically, the preset time interval may be set as required, for example, 10 seconds or 15 seconds.

Step 104: Initiate a media recognition request according to the testing sample to a real-time streaming media recognition service provider, and receive a media recognition result of the testing sample returned according to the media recognition request.

In this embodiment, the step of initiating a media recognition request according to the testing sample includes: initiating the media recognition request according to the testing sample by complying with a client request protocol of the real-time streaming media recognition service provider.

A program is used to a simulate a client of the real-time streaming media recognition service provider, so as to originate the media recognition request for a backend real-time streaming media recognition service provider and receive the returned media recognition result, which avoids dependence on hardware equipment, in addition, a protocol format and command used by the media recognition request are consistent with those of the client, so as to ensure that the real-time streaming media recognition service provider can receive and process them correctly. Content included in the media recognition result differs for different testing samples. For example, if the testing sample is television audio, the media recognition result may include a value of television channel information and the like; if the testing sample is radio audio, the media recognition result may include a value of radio channel information, for example, the number corresponding to an 88.8 Hz radio channel is 0001.

Step 106: Obtain an expected output according to characteristics of the testing sample, and compare the media recognition result with the expected output; if the two are same, indicate that the real-time streaming media recognition service provider is normal; otherwise, indicate that the real-time streaming media recognition service provider is abnormal.

In this embodiment, the recorded characteristics of the testing sample include the attribute and identifier of the testing sample. The attribute and identifier of the media recognition result are compared with the recorded attribute and identifier of the testing sample. If they are same, it indicates that the real-time streaming media recognition service provider is normal; otherwise, it indicates that the real-time streaming media recognition service provider is abnormal. Herein, the service being normal means that functions and stability of the real-time streaming media recognition service provider are normal, and the service being abnormal means that functions and stability of the real-time streaming media recognition service provider are in an abnormal state.

The expected output refers to a preset result that is expected to be obtained according to the testing sample after testing. For example, if the testing sample is television audio, attribute content of the television audio includes time when the television audio is extracted (for example, extraction starts at 15:30:20, Jun. 24, 2014), length of television audio (10 seconds), size (20 kilobytes), television channel information of the extracted television audio, and a source of the extracted television audio. The television channel information is used as an identifier of the television audio, and the identifier is used as a value for determining the expected output of the television audio. For example, if the testing sample is radio audio, attribute content of the radio audio includes time when the radio audio is extracted (for example, extraction starts at 15:30:20, Jun. 24, 2014), length of radio audio (10 seconds), size (20 kilobytes), radio channel information of the extracted radio audio, and a source of the extracted radio audio. The radio channel information is used as an identifier of the radio audio, and the identifier is used as a value for determining the expected output of the radio audio. The returned media recognition result is a value of television audio information, and the returned value of the television audio information is compared with an expected value of the television audio information. If the two are same, it indicates that the real-time streaming media recognition service provider is normal; otherwise, it indicates that the real-time streaming media recognition service provider is abnormal.

Specifically, for example, the testing sample is television audio. If the television channel to be tested is CCTV-1 and a corresponding ID number of CCTV-1 in the real-time streaming media recognition service is 001, the system 200 for testing and monitoring a real-time streaming media recognition service provider is connected to a CCTV-1 channel television signal source (a cable television signal or a satellite television signal), uses a real-time streaming media recognition service to extract a feature of the television signal source, and captures clips (for example, 3 seconds, 5 seconds or 8 seconds) of the extracted feature of the television signal source by a length of the feature audio clips (which may be a preset length) captured by the client of the real-time streaming media recognition service. A simulated client of the real-time streaming media recognition service sends the extracted feature of the fixed length to the real-time streaming media recognition service according to a preset protocol, and receives the result returned by the real-time streaming media recognition service provider. Because it is known that the signal source for the testing sample is the CCTV-1 channel, the expected output of the testing is the ID number 001 of the CCTV-1 channel. When the received ID number in the media recognition result returned by the real-time streaming media recognition service provider is 001, the media recognition result is consistent with the expected output, which indicates that the real-time streaming media recognition service provider correctly recognizes the testing sample. If the ID number in the media recognition result is not 001, the media recognition result is inconsistent with the expected output, which indicates that the real-time streaming media recognition service provider fails to recognize the testing sample correctly. Similarly, by using different television signal sources, extracting features, and using the features as testing samples, whether the real-time streaming media recognition service provider can accurately recognize a program of each television channel can be verified one by one, so as to meet recognizing and monitoring requirements.

In the method for testing and monitoring a real-time streaming media recognition service provider, a testing sample is selected from a streaming media signal source, the testing sample is analyzed to obtain a media recognition result, and the media recognition result is compared with an expected output of the testing sample, and if the two are same, it indicates that the real-time streaming media recognition service provider is normal. A segment of streaming media is extracted from the real-time streaming media signal source to generate the testing sample, the expected output of the testing sample is recorded, and the media recognition result is compared with the expected output, which achieves real-time testing and monitoring of the real-time streaming media recognition service provider and ensures that functions and stability of the real-time streaming media recognition service provider are in a normal state.

Figure 2:
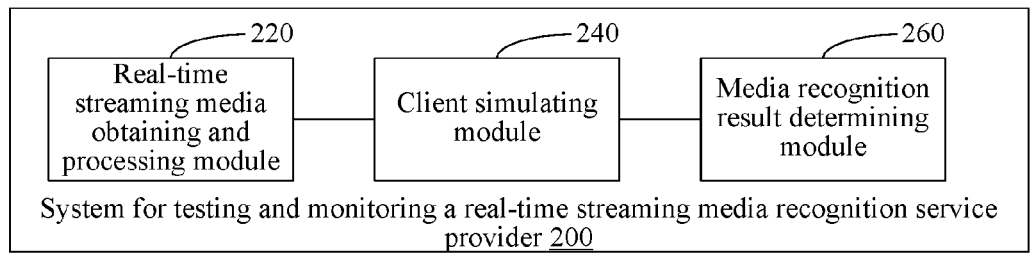
FIG. 2 is a structural block diagram of a system for testing and monitoring a real-time streaming media recognition service provider in an embodiment.

FIG. 2 is a structural block diagram of a system 200 for testing and monitoring a real-time streaming media recognition service provider in an embodiment. The system 200 for testing and monitoring a real-time streaming media recognition service provider includes a real-time streaming media obtaining and processing module 220, a client simulating module 240 and a media recognition result determining module 260. In some embodiments, the system 200 includes one or more processors, memory and a system bus. Various system components including the memory and the processors are connected to the system bus. The processors are hardware for executing computer program instructions through basic arithmetic and logic operations in the computer system. The memory is a physical device for temporarily or permanently storing computer programs or data (for example, program state information). The system bus may be any one of the following types of bus structures: a storage bus or storage controller, a peripheral bus and a local bus. The processors and the memory may perform data communication with a streaming media signal source and/or real-time streaming media service provider through the system bus. The memory includes a non-transitory computer readable medium such as read-only memory (ROM) or a flash memory (both not shown), and random access memory (RAM), where the RAM generally refers to a main memory loaded with an operating system and application programs.

The real-time streaming media obtaining and processing module 220 is configured to obtain a streaming media signal source, select a testing sample from the streaming media signal source, and record characteristics of the testing sample.

The real-time streaming media obtaining and processing module 220 is further configured to convert the testing sample into a digital streaming format preset by the real-time streaming media service.

The streaming media signal source may be a signal source such as television audio, an image screenshot or radio audio. The streaming media signal source is converted into a digital streaming format preset by the real-time streaming media service. The converted signal source may be audio of a certain length, one or more image screenshots, or an extracted feature value of audio or an image. Then, a streaming media segment is selected from the converted streaming media signal source, and is used as a testing sample for testing and monitoring, and identification information such as an attribute and an identifier of the testing sample is recorded.

The testing sample refers to streaming media data input to a real-time streaming media recognition service provider. The real-time streaming media recognition service provider is a background service system Which processes streaming media in a backend server, recognizes certain information from streaming media information, and provides more specific recognizing information. For specific content types of different streaming media, the system can recognize different streaming media such as audio, video, multimedia, and text. Testing refers to a system environment for verifying actual functions and performance of the real-time streaming media recognition service provider before releasing its service. Monitoring refers to a system environment for monitoring and tracking stability of the real-time streaming media recognition service provider and issuing fault alarms after releasing its service.

The recorded characteristics of the testing sample include the attributes and identifier of the testing sample. Attributes of different testing samples are different. For example, if a testing sample is television audio, the attributes include time when the feature is extracted, length and size of feature audio, television channel information of the extracted feature, a source of the extracted signal and the like. The identifier is used for uniquely identifying a testing sample, such as television channel information.

The real-time streaming media obtaining and processing module 220 is further configured to select the testing sample from the streaming media signal source at a preset time interval. Specifically, the preset time interval may be set as required, for example, 10 seconds or 15 seconds.

The client simulating module 240 is configured to initiate a media recognition request according to the testing sample, and receive a media recognition result of the testing sample returned according to the media recognition request.

The client simulating module 240 is further configured to initiate the media recognition request according to the testing sample by complying with a client request protocol of the real-time streaming media recognition service provider.

A program is used to a simulate a client of the real-time streaming media recognition service provider, so as to originate the media recognition request for a backend real-time streaming media recognition service provider and receive the returned media recognition result, which avoids dependence on hardware equipment. In addition, a protocol format and command used by the media recognition request are consistent with those of the client, so as to ensure that the real-time streaming media recognition service provider can receive and process them correctly.

The media recognizing result determining module 260 is configured to obtain an expected output according to the characteristics of the testing sample, and compare the media recognition result with the expected output. If the two are same, it indicates that the real-time streaming media recognition service provider is normal; otherwise, it indicates that the real-time streaming media recognition service provider is abnormal.

In this embodiment, the recorded characteristics of the testing sample include the attribute and identifier of the testing sample. The media recognizing result determining module 260 is further configured to compare the attribute and identifier of the media recognition result with the recorded attribute and identifier of the testing sample. If they are same, it indicates that the real-time streaming media recognition service provider is normal; otherwise, it indicates that the real-time streaming media recognition service provider is abnormal. Herein, the service being normal means that functions and stability of the real-time streaming media recognition service provider are normal, and the service being abnormal means that functions and stability of the real-time streaming media recognition service provider are in an abnormal state.

In the system 200 for testing and monitoring a real-time streaming media recognition service provider, a testing sample is selected from a streaming media signal source, the testing sample is analyzed to obtain a media recognition result, and the media recognition result is compared with an expected output of the testing sample, and if the two are same, it indicates that the real-time streaming media recognition service provider is normal. A segment of streaming media is extracted from the real-time streaming media signal source to generate the testing sample, the expected output of the testing sample is recorded, and the media recognition result is compared with the expected output, which achieves real-time testing and monitoring of the real-time streaming media recognition service provider and ensures that functions and stability of the real-time streaming media recognition service provider are in a normal state.

Besides, whether the media recognition result of the testing sample is consistent with the expected output can also be verified by manually using a real client of the real-time streaming media recognition service provider to perform functional operations.

Figure 3:
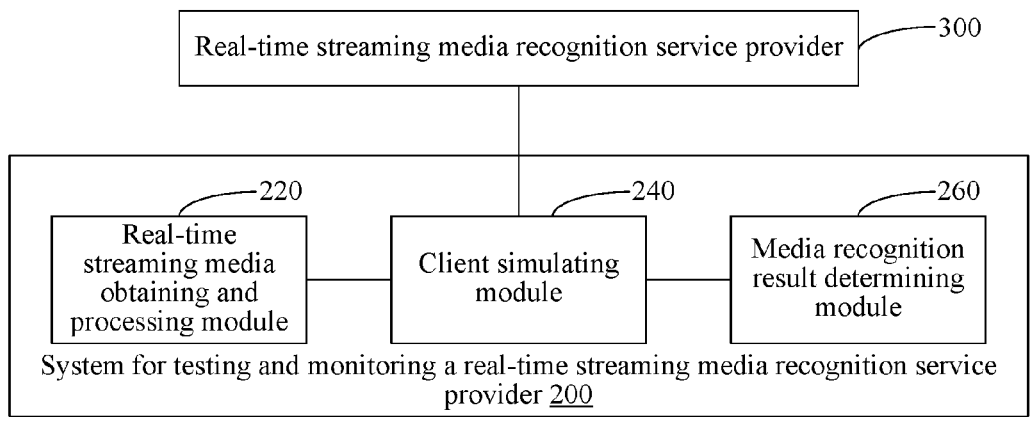
FIG. 3 is a schematic diagram of interaction between a system for testing and monitoring a real-time streaming media recognition service provider and a real-time streaming media recognition service provider.

FIG. 3 is a schematic diagram of interaction between a system 200 for testing and monitoring a real-time streaming media recognition service provider and a real-time streaming media recognition service provider 300. In FIG. 3, a client simulating module 240 in the system 200 for testing and monitoring a real-time streaming media recognition service provider initiates a media recognition request towards the real-time streaming media recognition service provider 300 using a selected testing sample, and receives a media recognition result of the testing sample generated by the real-time streaming media recognition service provider 300. A media recognition result determining module 260 is configured to compare the media recognition result of the testing sample with an expected output of the testing sample. If the two are same, it indicates that the real-time streaming media recognition service provider 300 recognizes normally; otherwise, it indicates that the real-time streaming media recognition service provider 300 recognizes abnormally, and the returned media recognition result needs to be tracked and recorded for analysis.

Figure 4:
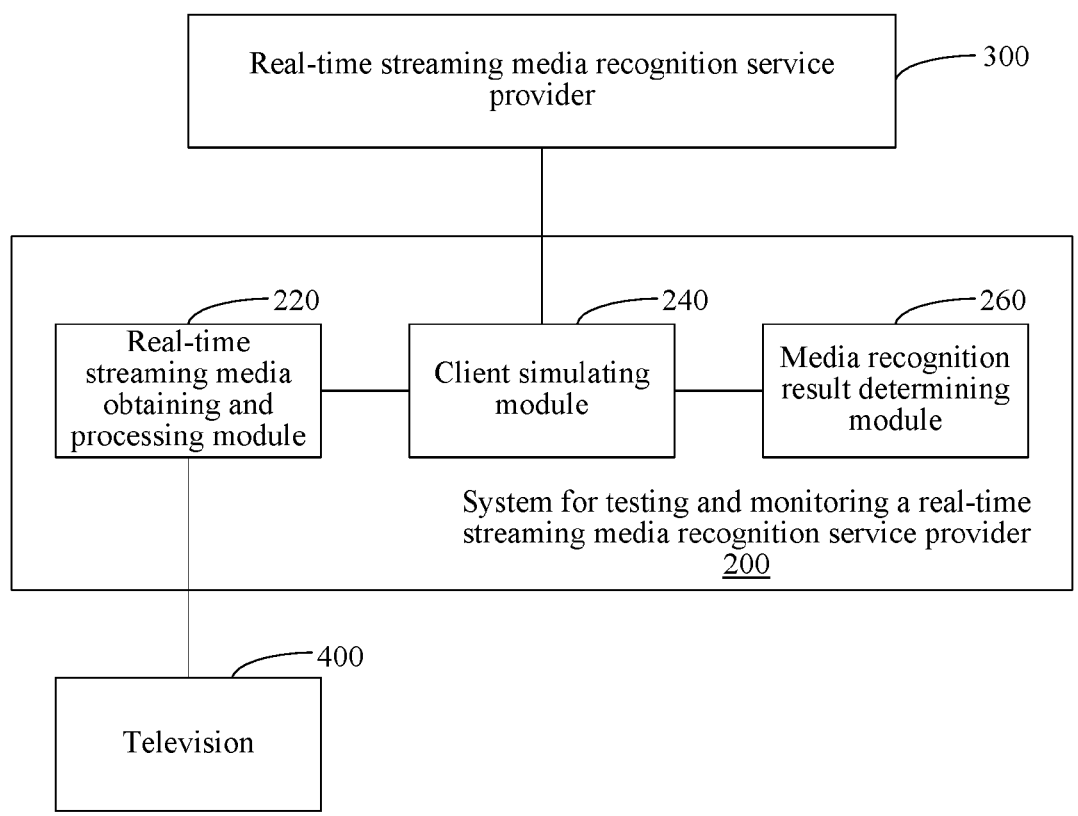
FIG. 4 is a schematic diagram of a system for testing and monitoring a real-time streaming media recognition service provider when applied to a television.

FIG. 4 is a schematic diagram of a system 200 for testing and monitoring a real-time streaming media recognition service provider when it is applied to a television. In FIG. 4, a television 400 provides a real-time streaming media signal source; a real-time streaming media obtaining and processing module 220 obtains the real-time streaming media signal source (such as audio), and converts the audio according to a format preset by a real-time streaming media recognition service provider; a segment of the audio is selected from the converted real-time streaming media signal source as a testing sample; the testing sample is sent to a client simulating module 240; the client simulating module 240 initiates a media recognition request towards a real-time streaming media recognition service provider 300 according to the testing sample, and receives a media recognition result of the testing sample made by the real-time streaming media recognition service provider. A media recognition result determining module 260 is configured to compare the media recognition result of the testing sample with an expected output of the testing sample. If the two are same, it indicates that the real-time streaming media recognition service provider 300 recognizes normally; otherwise, it indicates that the real-time streaming media recognition service provider 300 recognizes abnormally, and the returned media recognition result needs to be tracked and recorded for analysis.

Besides, the system 200 for testing and monitoring a real-time streaming media recognition service provider may also be applied to a radio station, network streaming media video and the like.

A person of ordinary skill in the art may understand that all or a part of the processes for implementing the foregoing method embodiments may be completed by related hardware according to instructions of a computer program. The program may be stored in a computer readable storage medium. For example, in the embodiments of the present application, the program may be stored in a storage medium of a computer system, and is executed by at least one processor of the computer system to implement the processes of the method embodiments. The storage medium may be a magnetic disk, an optical disc, a Read-Only Memory (ROM), a Random Access Memory (RAM) or the like.

While particular embodiments are described above, it will be understood it is not intended to limit the invention to these particular embodiments. On the contrary, the invention includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

The terminology used in the description of the invention herein is for the purpose of describing particular embodiments only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, operations, elements, and/or components, but do not preclude the presence or addition of one or more other features, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussion above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method of testing and monitoring a real-time streaming media recognition service provider, the method comprising:
    at a computer system having one or more processors and memory for storing programs to be executed by the one or more processors:
        obtaining a streaming media signal source;
        selecting a testing sample from the streaming media signal source;
        recording characteristics of the testing sample;
        obtaining an expected output according to the characteristics of the testing sample;
        converting the testing sample into a digital streaming format preset by the real-time streaming media service provider;
        initiating a media recognition request according to the testing sample in the digital streaming format to the real-time streaming media recognition service provider;
        receiving a media recognition result of the testing sample returned by the real-time streaming media recognition service provider according to the media recognition request;
        comparing the media recognition result with the expected output;
        indicating whether the real-time streaming media recognition service provider is normal in accordance with the comparison result.

2. The method of claim 1, wherein the testing sample is selected from the streaming media signal source at a preset time interval.

3. The method of claim 1, wherein the digital streaming format is supported by a predefined set of client-side electronic devices.

4. The method of claim 3, wherein the media recognition request is a simulation of a request from one of the predefined set of client-side electronic devices supporting the digital streaming format.

5. The method of claim 3, wherein the real-time streaming media recognition service provider is normal when the media recognition result is the same as the expected output and the real-time streaming media recognition service provider is abnormal when the media recognition result is different from the expected output.

6. The method of claim 1, wherein the testing sample is one selected from the group consisting of television audio, an image screenshot, and radio audio, and the recorded characteristics of the testing sample include a predefined set of attributes of the testing sample including time when the testing sample is extracted, length and size of the testing sample.

7. A computer system, comprising:
one or more processors;
memory; and
one or more program modules stored in the memory, wherein the one or more program modules include instructions to be executed by the one or more processors, the instructions further including:
obtaining a streaming media signal source;
selecting a testing sample from the streaming media signal source;
recording characteristics of the testing sample;
obtaining an expected output according to the characteristics of the testing sample;
converting the testing sample into a digital streaming format preset by the real-time streaming media service provider;
initiating a media recognition request according to the testing sample in the digital streaming format to the real-time streaming media recognition service provider;
receiving a media recognition result of the testing sample returned by the real-time streaming media recognition service provider according to the media recognition request;
comparing the media recognition result with the expected output;
indicating whether the real-time streaming media recognition service provider is normal in accordance with the comparison result.

8. The computer system of claim 7, wherein the testing sample is selected from the streaming media signal source at a preset time interval.

9. The computer system of claim 7, wherein the digital streaming format is supported by a predefined set of client-side electronic devices.

10. The computer system of claim 9, wherein the media recognition request is a simulation of a request from one of the predefined set of client-side electronic devices supporting the digital streaming format.

11. The computer system of claim 7, wherein the real-time streaming media recognition service provider is normal when the media recognition result is the same as the expected output and the real-time streaming media recognition service provider is abnormal when the media recognition result is different from the expected output.

12. The computer system of claim 7, wherein the testing sample is one selected from the group consisting of television audio, an image screenshot, and radio audio, and the recorded characteristics of the testing sample include a predefined set of attributes of the testing sample including time when the testing sample is extracted, length and size of the testing sample.

13. A non-transitory computer readable storage medium storing one or more program modules, the one or more program modules comprising instructions, which, when executed by one or more processors of a computer system, cause the processors to perform operations including:
obtaining a streaming media signal source;
selecting a testing sample from the streaming media signal source;
recording characteristics of the testing sample;
obtaining an expected output according to the characteristics of the testing sample;
converting the testing sample into a digital streaming format preset by the real-time streaming media service provider;
initiating a media recognition request according to the testing sample in the digital streaming format to the real-time streaming media recognition service provider;
receiving a media recognition result of the testing sample returned by the real-time streaming media recognition service provider according to the media recognition request;
comparing the media recognition result with the expected output;
indicating whether the real-time streaming media recognition service provider is normal in accordance with the comparison result.

14. The non-transitory computer readable storage medium of claim 13, wherein the testing sample is selected from the streaming media signal source at a preset time interval.

15. The non-transitory computer readable storage medium of claim 13, wherein the digital streaming format is supported by a predefined set of client-side electronic devices.

16. The non-transitory computer readable storage medium of claim 15, wherein the media recognition request is a simulation of a request from one of the predefined set of client-side electronic devices supporting the digital streaming format.

17. The non-transitory computer readable storage medium of claim 13, wherein the real-time streaming media recognition service provider is normal when the media recognition result is the same as the expected output and the real-time streaming media recognition service provider is abnormal when the media recognition result is different from the expected output.

* * * * *